United States Patent
Ghazavi et al.

(10) Patent No.: US 12,130,207 B2
(45) Date of Patent: Oct. 29, 2024

(54) METHOD OF DETECTING A LEAK IN A FLUID CONDUIT

(71) Applicant: HIFI ENGINEERING INC., Calgary (CA)

(72) Inventors: Niloufar Ghazavi, Calgary (CA); Arne Dankers, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 351 days.

(21) Appl. No.: 17/634,525

(22) PCT Filed: Aug. 10, 2020

(86) PCT No.: PCT/CA2020/051095
§ 371 (c)(1),
(2) Date: Feb. 10, 2022

(87) PCT Pub. No.: WO2021/026645
PCT Pub. Date: Feb. 18, 2021

(65) Prior Publication Data
US 2022/0334020 A1 Oct. 20, 2022

Related U.S. Application Data

(60) Provisional application No. 62/885,665, filed on Aug. 12, 2019.

(51) Int. Cl.
*G01M 3/24* (2006.01)
*G01H 9/00* (2006.01)

(52) U.S. Cl.
CPC ............ *G01M 3/243* (2013.01); *G01H 9/004* (2013.01)

(58) Field of Classification Search
CPC ........ G01M 3/243; G01H 9/004; G01H 9/006
See application file for complete search history.

(56) References Cited

U.S. PATENT DOCUMENTS

| 10,060,578 | B2 | 8/2018 | Battaglini et al. | |
|---|---|---|---|---|
| 2012/0079872 | A1* | 4/2012 | Schaefer | G01M 3/2807 73/40.5 A |
| 2012/0180552 | A1* | 7/2012 | Calvo | G01M 11/083 73/40.5 A |

(Continued)

FOREIGN PATENT DOCUMENTS

| AU | 2017393649 A1 | 11/2018 | |
|---|---|---|---|
| GB | 2378756 A * | 2/2003 | G01M 3/243 |

(Continued)

OTHER PUBLICATIONS

Lu, Z., & Sabatier, J. M. (2009). Effects of Soil Water Potential and Moisture Content on Sound Speed. Soil Science Society of America Journal, 73(5), 1614. https://doi.org/10.2136/sssaj2008.0073.

*Primary Examiner* — Nathaniel J Kolb
(74) *Attorney, Agent, or Firm* — D'Ambrosio & Menon, PLLC; Usha Menon

(57) ABSTRACT

Using at least one sensor positioned to monitor a fluid conduit, an acoustic event is detected. A speed of sound of the acoustic event is determined. The speed of sound of the acoustic event is compared to a baseline speed of sound. Based on the comparison, whether or not a leak has occurred in the fluid conduit may be determined.

18 Claims, 9 Drawing Sheets

(56) References Cited

U.S. PATENT DOCUMENTS

2012/0227499 A1* 9/2012 Amir .................... G01N 29/043
    73/622
2018/0149528 A1* 5/2018 Hull ......................... G01K 1/20
2018/0306753 A1* 10/2018 Perrier ................... G01N 29/07

FOREIGN PATENT DOCUMENTS

| WO | WO-2012117223 A1 * | 9/2012 | .......... G01M 11/085 |
| WO | 2013102252 A1 | 7/2013 | |
| WO | 2017147679 A1 | 9/2017 | |

* cited by examiner

METHOD OF DETECTING A LEAK IN A FLUID CONDUIT

FIELD OF THE DISCLOSURE

The present disclosure relates to methods and systems for detecting events, such as leaks, in a fluid conduit, such as a pipeline or a wellbore.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Optical fiber interferometry has been used for detecting leaks in fluid conduits. A leak will generally affect acoustic waves originating from the fluid conduit, and this change in acoustics can be detected and interpreted by the optical interrogation system. However, in general, leak signatures can often differ significantly depending on pressure, flow rate, orifice size, etc., making it difficult to detect a leak based on its signature.

The present disclosure seeks to provide a novel and innovative way of detecting leaks in fluid conduits.

SUMMARY OF THE DISCLOSURE

According to a first aspect of the disclosure, there is provided a method of detecting a leak in a fluid conduit, comprising: detecting an acoustic event using at least one sensor positioned to monitor the fluid conduit; determining a speed of sound of the acoustic event; comparing the speed of sound of the acoustic event to a baseline speed of sound; and determining, based on the comparison, whether a leak has occurred in the fluid conduit.

Detecting the acoustic event may comprise detecting the acoustic event at one or more different locations, thereby detecting a respective acoustic signal at each of the one or more locations. Determining the speed of sound of the acoustic event may be based on the detected one or more acoustic signals.

The method may further comprise, prior to detecting the acoustic event: detecting one or more baseline acoustic events using the at least one sensor; determining a speed of sound of the one or more baseline acoustic events; and determining the baseline speed of sound based on the speed of sound of the one or more baseline acoustic events.

Detecting the one or more baseline acoustic events may comprise detecting each baseline acoustic event at one or more different locations, thereby detecting a respective baseline acoustic signal at each of the one or more locations. Determining the speed of sound of the one or more baseline acoustic events may be based on the detected one or more baseline acoustic signals.

Determining the speed of sound of the acoustic event may comprise: determining that first and second acoustic signals detected respectively at first and second different locations correspond to the acoustic event; and determining the speed of sound of the acoustic event based on a distance separating the first and second locations and based on an amount of time that has elapsed between detection of the first and second acoustic signals.

Determining that the first and second acoustic signals correspond to the acoustic event may comprise determining a cross-correlation the first acoustic signal with the second acoustic signal.

The second acoustic signal may comprise a reflection of the first acoustic signal. Determining the cross-correlation may comprise determining an auto-correlation of the first acoustic signal.

Determining the speed of sound of the acoustic event may be based on a distance between the at least one sensor and a known acoustic source, and may be further based on an amount of time that has elapsed between generation of the acoustic event by the acoustic source and detection of the acoustic event.

Determining whether a leak has occurred may comprise determining whether a difference between the speed of sound of the acoustic event and the baseline speed of sound is greater than a preset threshold.

Determining a speed of sound of the acoustic event may comprise: determining a speed of sound of the acoustic event in a first direction; and determining a speed of sound of the acoustic event in a second direction. Comparing the speed of sound of the acoustic event to the baseline speed of sound may comprise: comparing the speed of sound of the acoustic event in the first direction to a baseline speed of sound in the first direction; and comparing the speed of sound of the acoustic event in the second direction to a baseline speed of sound in the second direction.

The at least one sensor may be located outside of the fluid conduit.

The at least one sensor may be at least partially buried beneath ground level.

The at least sensor may be located within the conduit.

Detecting the one or more baseline acoustic events may comprise detecting the one or more baseline acoustic events when a fluid is flowing through the fluid conduit.

Detecting the acoustic event may comprise detecting the acoustic event when the same fluid is flowing through the fluid conduit.

The at least one sensor may comprise at least one optical fiber positioned alongside the fluid conduit.

Detecting the acoustic event may comprise: interrogating the optical fiber to obtain phase data from the optical fiber; and extracting from the phase data an acoustic signal corresponding the acoustic event.

According to a further aspect of the disclosure, there is provided a system comprising: a fluid conduit; one or more sensors positioned to monitor the fluid conduit; and one or more processors communicative with memory having stored thereon computer program code configured, when executed by the one or more processors, to cause the one or more processors to perform a method comprising: detecting an acoustic event using the one or more sensors; determining a speed of sound of the acoustic event; comparing the speed of sound of the acoustic event to a baseline speed of sound; and determining, based on the comparison, whether a leak has occurred in the fluid conduit.

The method may comprise any of the features described above in connection with the first aspect of the disclosure.

According to a further aspect of the disclosure, there is provided a computer-readable medium having stored thereon computer program code configured, when executed by one or more processors, to cause the one or more processors to perform a method comprising: detecting an acoustic event using at least one sensor positioned to monitor a fluid conduit; determining a speed of sound of the acoustic event; comparing the speed of sound of the acoustic event to a baseline speed of sound; and determining, based on the comparison, whether a leak has occurred in the fluid conduit.

The method may comprise any of the features described above in connection with the first aspect of the disclosure.

According to a further aspect of the disclosure, there is provided a method of determining a moisture content of soil, comprising: detecting an acoustic event travelling through soil using at least one sensor; determining a speed of sound of the acoustic event; comparing the speed of sound of the acoustic event to a baseline speed of sound; and determining, based on the comparison, a moisture content of the soil.

The present disclosure further extends to a system and computer-readable medium for implementing the above-described method of determining a moisture content of soil.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide improved methods and systems for detecting events, such as leaks, in a fluid conduit. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described methods and systems for detecting leaks or similar events in a fluid conduit. One or more sensors, such as optical fiber buried alongside the fluid conduit, are used to detect, during a "leak detection phase", one or more acoustic signals at one or more different locations. The acoustic signals may be correlated to a common acoustic event. For example, a first acoustic signal may be cross-correlated with a second acoustic signal and, based on the result, a determination may be made as to whether the acoustic signals are correlated to the same acoustic event. In other words, a determination may be made as to whether the first and second acoustic signals correspond to the same acoustic event being detected sequentially at a first location and subsequently at a second location. Based on the locations at which the acoustic signals are detected, and based on a time that has elapsed between detection of the first and second acoustic signals, a speed of sound of the acoustic event may be determined. This speed of sound may then be compared to a baseline speed of sound. The baseline speed of sound may be an average speed of sound of acoustic events observed during a "baselining phase", or calibration phase, of the system. The baselining phase may be a phase during which it is known that the fluid conduit does not comprise any leaks. During this baselining phase, the speed of sound of multiple acoustic events is determined and may then be averaged to obtain the baseline speed of sound.

If the speed of sound of the acoustic event is sufficiently lower than the baseline speed of sound, then the system may determine that a leak has occurred. This determination is based on the fact that the speed of sound in soil decreases generally with moisture content. Thus, as the leak occurs, the moisture content in the soil within which the one or more sensors are buried increases, resulting in a decrease in the speed of sound of acoustic waves travelling through the wet soil.

Figure 1A:
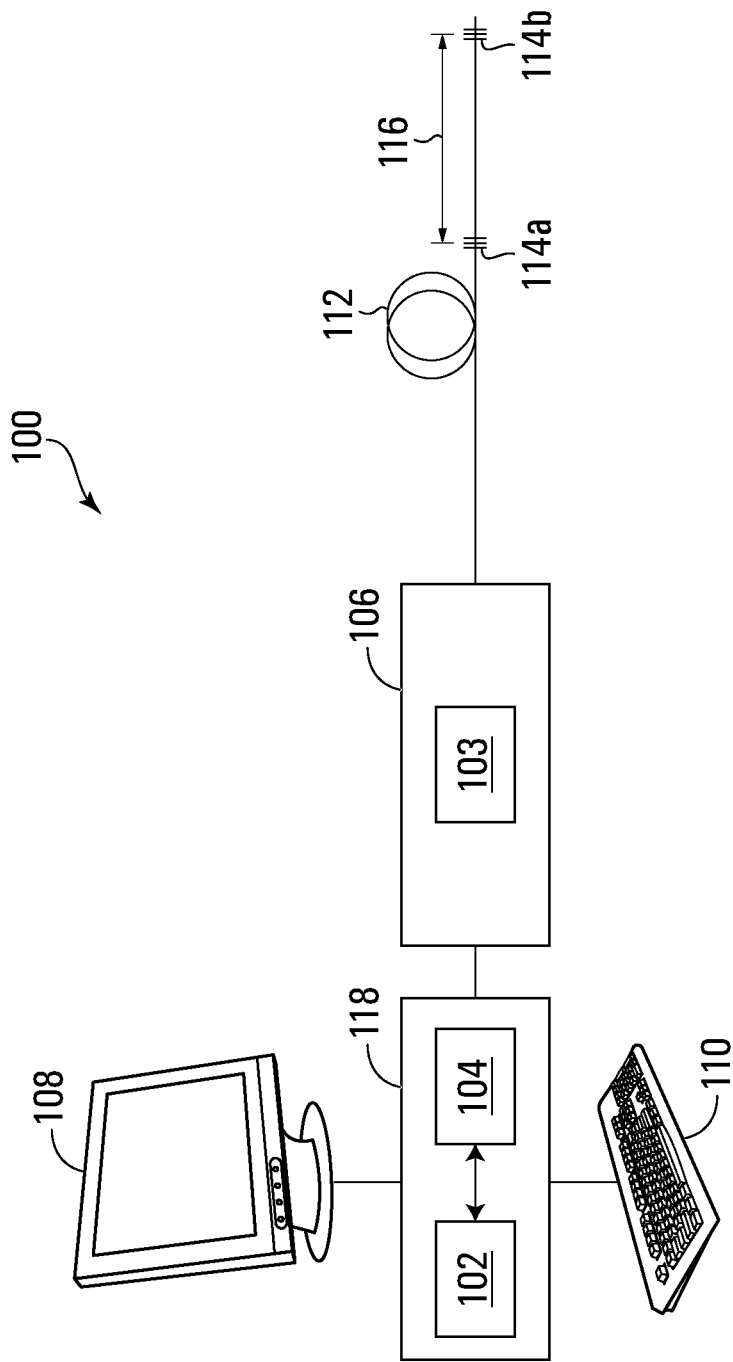
FIG. 1A is a block diagram of a system for determining whether an event has occurred from dynamic strain measurements, which includes an optical fiber with fiber Bragg gratings ("FBGs") for reflecting a light pulse, in accordance with embodiments of the disclosure.

Referring now to FIG. 1A, there is shown one embodiment of a system 100 for performing interferometry using fiber Bragg gratings ("FBGs"), in accordance with embodiments of the disclosure. The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
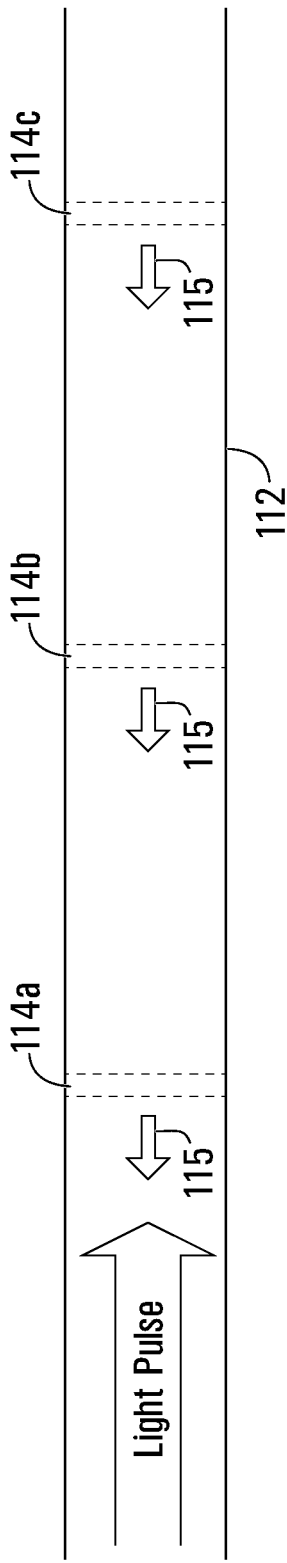
FIG. 1B is a schematic diagram that depicts how the FBGs reflect a light pulse, in accordance with embodiments of the disclosure.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\Theta$) is as follows:

$$\Theta = 2\pi nL/\lambda,$$

where n is the index of refraction of the optical fiber, L is the physical path length of the fiber segment 116, and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 10, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 10, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
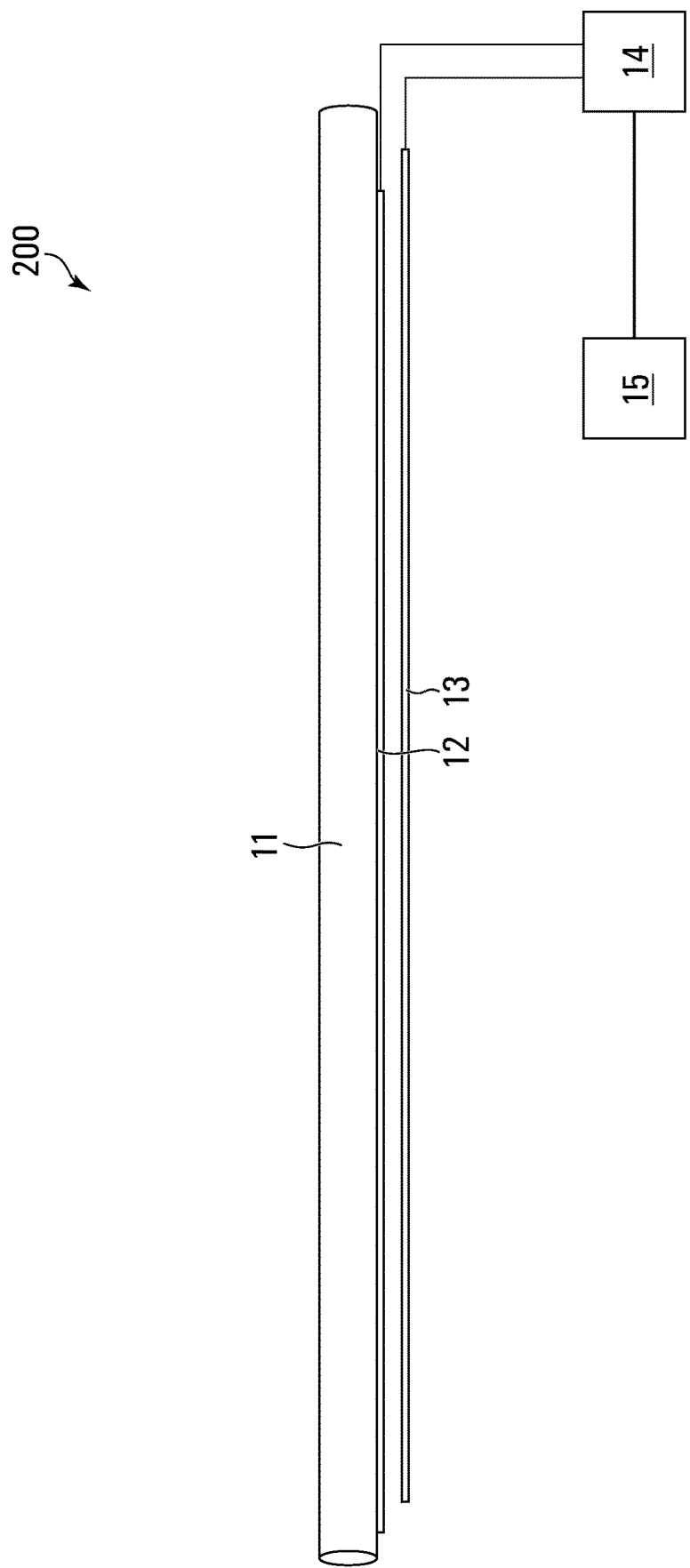
FIG. 2 is a schematic diagram of an optical interrogation system in accordance with embodiments of the disclosure.

Referring now to FIG. 2, there is shown an optical interrogation system 200 (similar to system 100) that may be used to detect events, such as leaks, in a pipeline, in accordance with embodiments of the disclosure. FIG. 2 shows a pipeline 11 alongside which are provided a pair of optical fibers 12, 13. Optical fiber 12 is located adjacent pipeline 11—for example, optical fiber 12 may be attached to pipeline 11. Optical fiber 13 is positioned alongside pipeline 11, but is located further from pipeline 11 than optical fiber 12. In some embodiments, each optical fiber 12, 13 may comprise multiple individual interconnected lengths of optical fiber. Pipeline 11, or portions of pipeline 11, may be suspended above ground level by using one or more supports as known in the art. Alternatively, pipeline 11, or portions of pipeline 11, may be partially or wholly buried. Optical fibers 12, 13, or portions of optical fibers 12, 13, are buried beneath ground level (according to some embodiments, only one of optical fibers 12, 13 is buried beneath ground level).

Each optical fiber is optically coupled to an interrogator 14. Interrogator 14 is configured to interrogate optical fibers 12, 13 using optical fiber interferometry, as described above. Interrogator 14 is communicatively coupled to a control module 15. Control module 15 comprises one or more processors and one or more memories comprising computer program code executable by the one or more processors and configured, when executed by the one or more processors, to cause the one or more processors to process phase data obtained by interrogator 14 from interferences between light pulses transmitted along optical fibers 12, 13. In some embodiments, control module 15 may be comprised within interrogator 14 such that interrogator 14 may perform the functions of control module 15.

System 200 may be used to detected leaks in pipeline 11, as described in further detail below.

Figure 3:
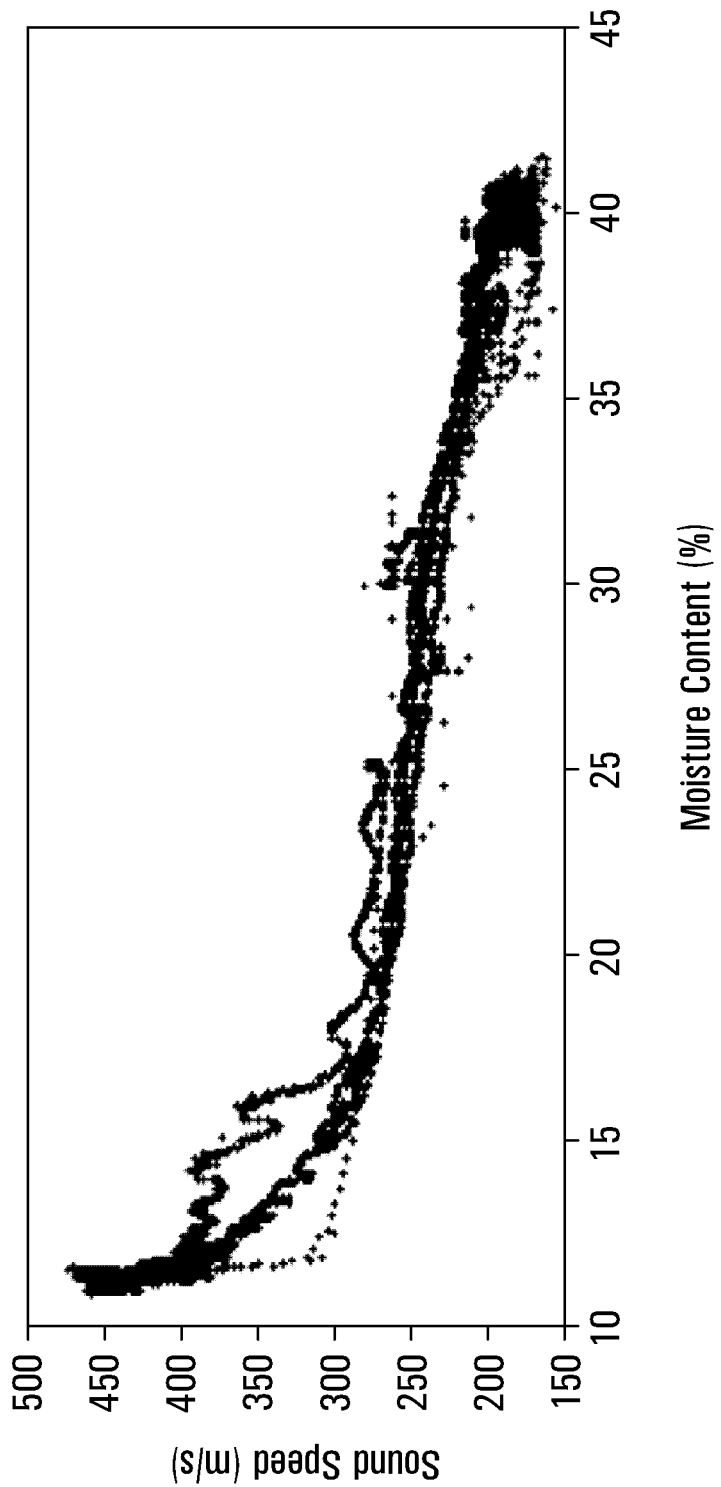
FIG. 3 is a plot of speed of sound as a function of moisture content in soil.

It is known (for example from "*Effects of Soil Water Potential and Moisture Content on Sound Speed*", by ZU, Zhqui, and SABATIER, James, Soil Science Society of America Journal, Vol. 73, Num. 5, September-October 2009) that the speed of sound within soil decreases with the moisture content of the soil. When soil is wet with a moisture content of about 17% to about 40%, the speed of sound varies roughly linearly, whereas, with a moisture content below roughly 17%, the speed of sound varies non-linearly (see FIG. 3). Accordingly, in the presence of a leak, acoustic waves should travel more slowly through the ground in the vicinity of the leak and in which optical fibers 12, 13 are buried.

Figure 4:
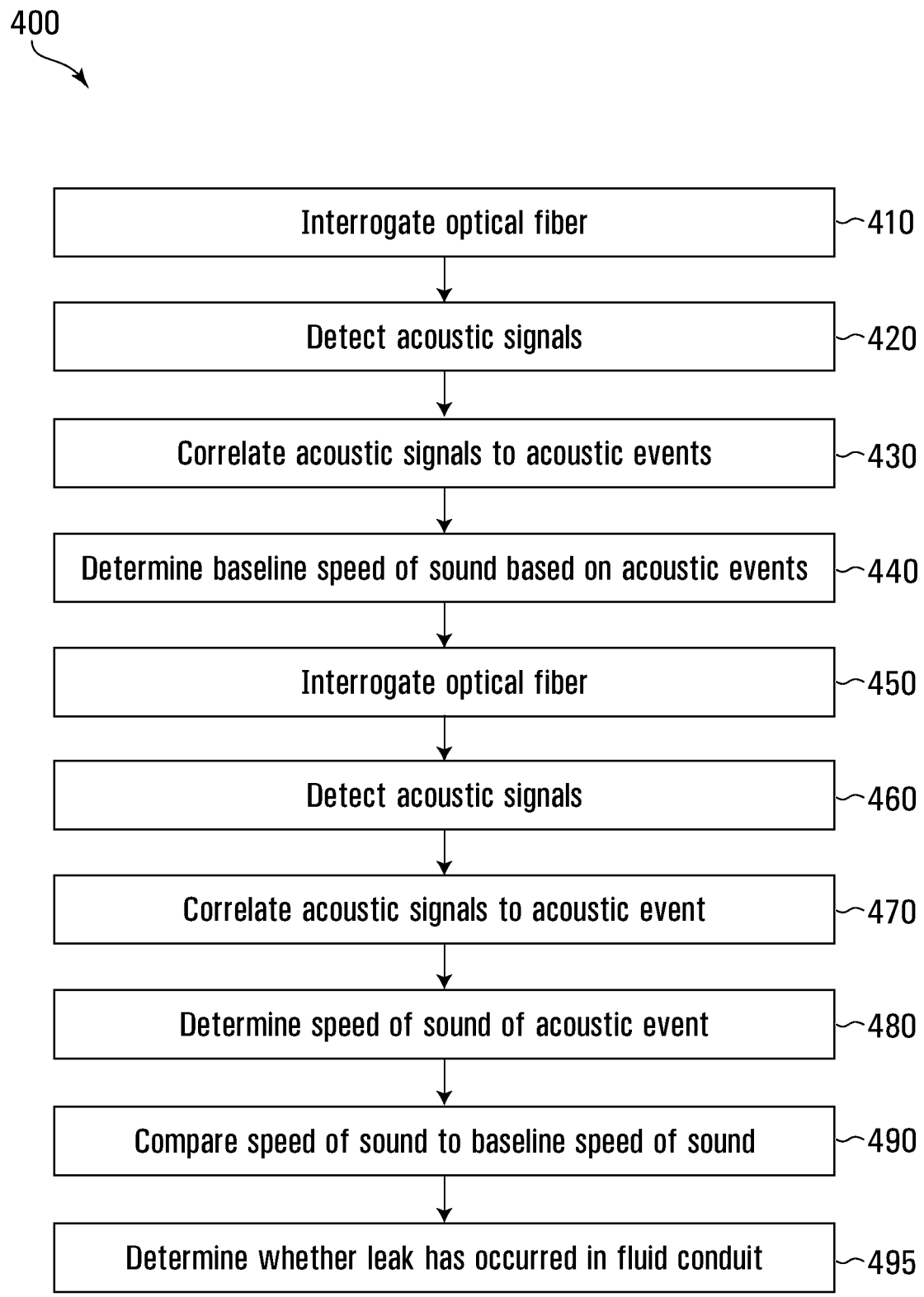
FIG. 4 is a flow diagram of a method of detecting a leak in a fluid conduit, in accordance with embodiments of the disclosure.

Turning to FIG. 4, there is described a method 400 of detecting a leak in a fluid conduit, using system 200, according to embodiments of the disclosure.

Figure 1C:
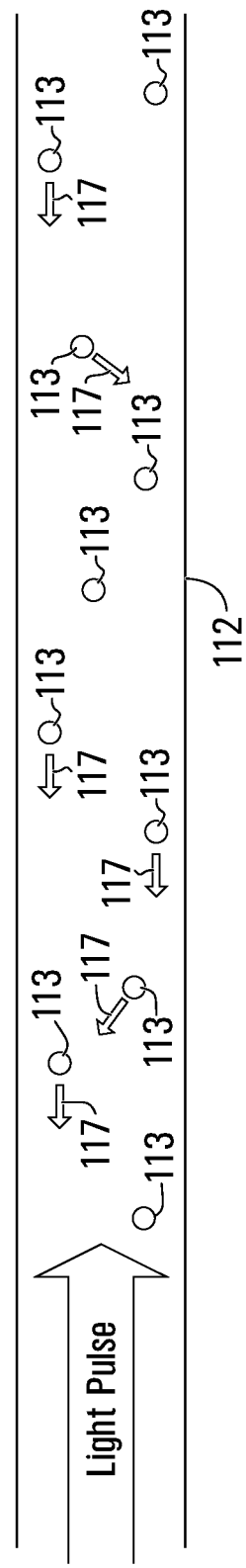
FIG. 1C is a schematic diagram that depicts how a light pulse interacts with impurities in an optical fiber that results in scattered laser light due to Rayleigh scattering, which is used for distributed acoustic sensing ("DAS"), in accordance with embodiments of the disclosure.

Starting at block 410, a baselining phase commences during which the goal is to obtain a baseline speed of sound of acoustic waves travelling through the ground in which optical fibers 12, 13 are buried. During the baselining phase, the ground (comprising soil) in which optical fibers 12, 13 are buried is known to be dry and relatively free of moisture. At block 410, optical fibers 12, 13 are interrogated by optical fiber interrogator 14. As described above in the context of FIGS. 1A-1C, light pulses are sent along optical fibers 12, 13 and reflected by FBGs positioned along optical fibers 12, 13. Interferences between the reflections are detected by optical fiber interrogator 14 as phase differences ("phase data").

At block 420, control module 15 processes the phase data obtained from each optical fiber 12, 13, and extracts from the phase data multiple acoustic signals. An acoustic signal may comprise, for example, a measure of a magnitude of an acoustic event, a frequency centroid of an acoustic event, a filtered baseline of an acoustic event, a harmonic power of an acoustic event, or time-integrated spectrum flux of an acoustic event. Methods of detecting acoustic signals from phase data are known in the art and are not described in further detail herein. For example, suitable methods of acoustic signal extraction are described in more detail in international patent publication WO 2017/147679, the contents of which is hereby incorporated by reference in its entirety.

At block 430, acoustic signals detected in optical fiber 12 are correlated to acoustic signals detected in optical fiber 13. For example, control module 15 determines a cross-correlation of acoustic signals detected in optical fiber 12 with acoustic signals detected in optical fiber 13. Thus, control module 15 may correlate individual acoustic signals detected in separate optical fibers 12, 13. In doing so, control module 15 may determine that respective acoustic signals detected in each of optical fibers 12, 13 correspond to the same acoustic event. In other words, control module 15 may determine that the detection of a first acoustic signal at a first location (e.g. the detection of a first acoustic signal by optical fiber 12), and the detection of a second acoustic signal at a second location (e.g. the detection of a second acoustic signal by optical fiber 13), are linked to detection of the same acoustic event.

Following the correlation of multiple acoustic signals to a common acoustic event, at block 440 control module 15 determines a speed of sound of the acoustic event. The speed of sound of the acoustic event may be determined by dividing the distance separating the first and second locations (e.g. the distance separating optical fibers 12, 13) by the time elapsed between the detection of the first and second acoustic signals.

Blocks 410-440 may be repeated for multiple acoustic events. An average of the measured speed of sound of many different acoustic events provides a baseline speed of sound that may then be used during a leak detection phase, as described below. Generally, a longer baselining phase results in a more accurate determination of the baseline speed of sound.

After the baselining phase of blocks 410-440, method 400 enters a leak detection phase (blocks 450-495). At block 450, optical fibers 12, 13 are interrogated by optical fiber interrogator 14, similarly to block 410. At block 460, control module 15 processes the phase data obtained from each optical fiber 12, 13, and extracts from the phase data multiple acoustic signals. At block 470, acoustic signals detected in optical fiber 12 are correlated to acoustic signals detected in optical fiber 13. For example, control module 15 determines a cross-correlation of acoustic signals detected in optical fiber 12 with acoustic signals detected in optical fiber 13. Thus, control module 15 may determine that the detection of a first acoustic signal at a first location (e.g. the detection of a first acoustic signal by optical fiber 12), and the detection of a second acoustic signal at a second location (e.g. the detection of a second acoustic signal by optical fiber 13), are linked to detection of the same acoustic event.

The strength of the cross-correlation between two acoustic signals is a measure of how likely the two acoustic signals are related to the same acoustic event. In order for two acoustic signals to be found to relate to the same acoustic event, a threshold may be used. According to such a threshold, a minimum cross-correlation is required in order to determine that two acoustic signals are related to the same acoustic event.

Following the correlation of multiple acoustic signals to a common acoustic event, at block 480 control module 15 determines a speed of sound of the acoustic event. The speed of sound of the acoustic event may be determined by dividing the distance separating the first and second locations (e.g. the distance separating optical fibers 12, 13) by the time elapsed between the detection of the first and second acoustic signals.

At block 490, control module 15 compares the speed of sound obtained at block 480 to the baseline speed of sound obtained at block 440. In particular, control module 15 determines whether a speed of sound of the acoustic event measured during the leak detection phase is sufficiently lower (e.g. lower than a preset threshold) from the baseline speed of sound determined at block 440. If so, then at block 495 control module 15 may determine that the moisture content of the soil at locations where optical fibers 12, 13 are buried has increased, and that a leak in pipeline 11 has occurred in the vicinity of these locations. Control module 15 may then alert a user, for example.

Figure 5:
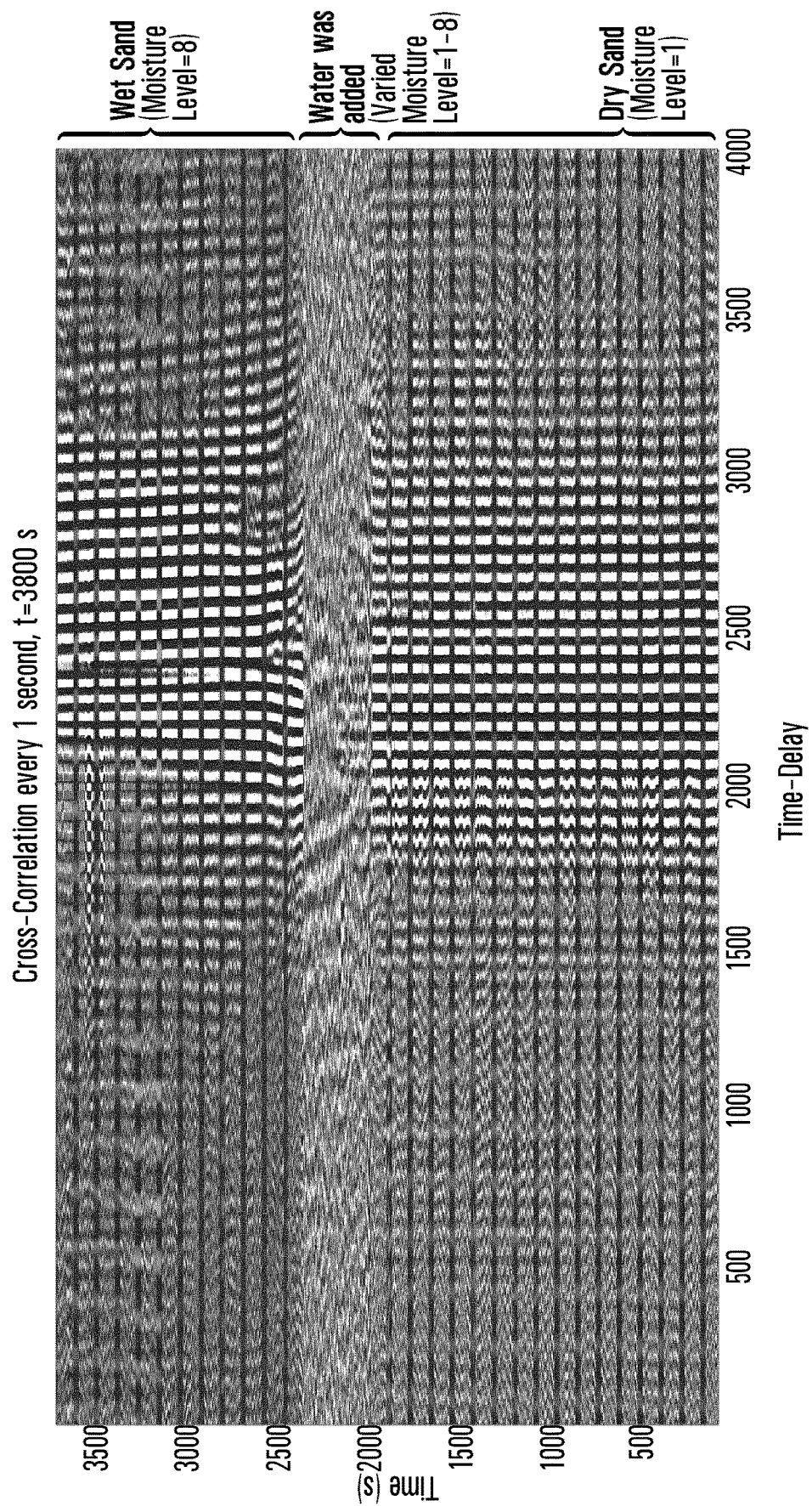
FIG. 5 is a plot of cross-correlation strength as a function of time and cross-correlation time delay, in accordance with embodiments of the disclosure.

FIG. 5 shows the results from an experiment in which the speed of sound in sand was measured under various conditions. Initially, the sand was dry. Water was then slowly added to the sand until the sand was wet. FIG. 5 shows the intensity of cross-correlation (represented by the colour variations in the plot) between two acoustic signals. The first acoustic signal is from a speaker placed in the sand, while the second acoustic signal was detected by a microphone placed some distance away from the speaker. The vertical axis shows the time (in seconds) since the start of the experiment. The horizontal axis shows the time delay (in units of 25 ms samples) for the cross correlation calculations. Note that the signal repeats because of reflections. The blue horizontal gaps exist because the speaker was operated intermittently.

Figure 6:
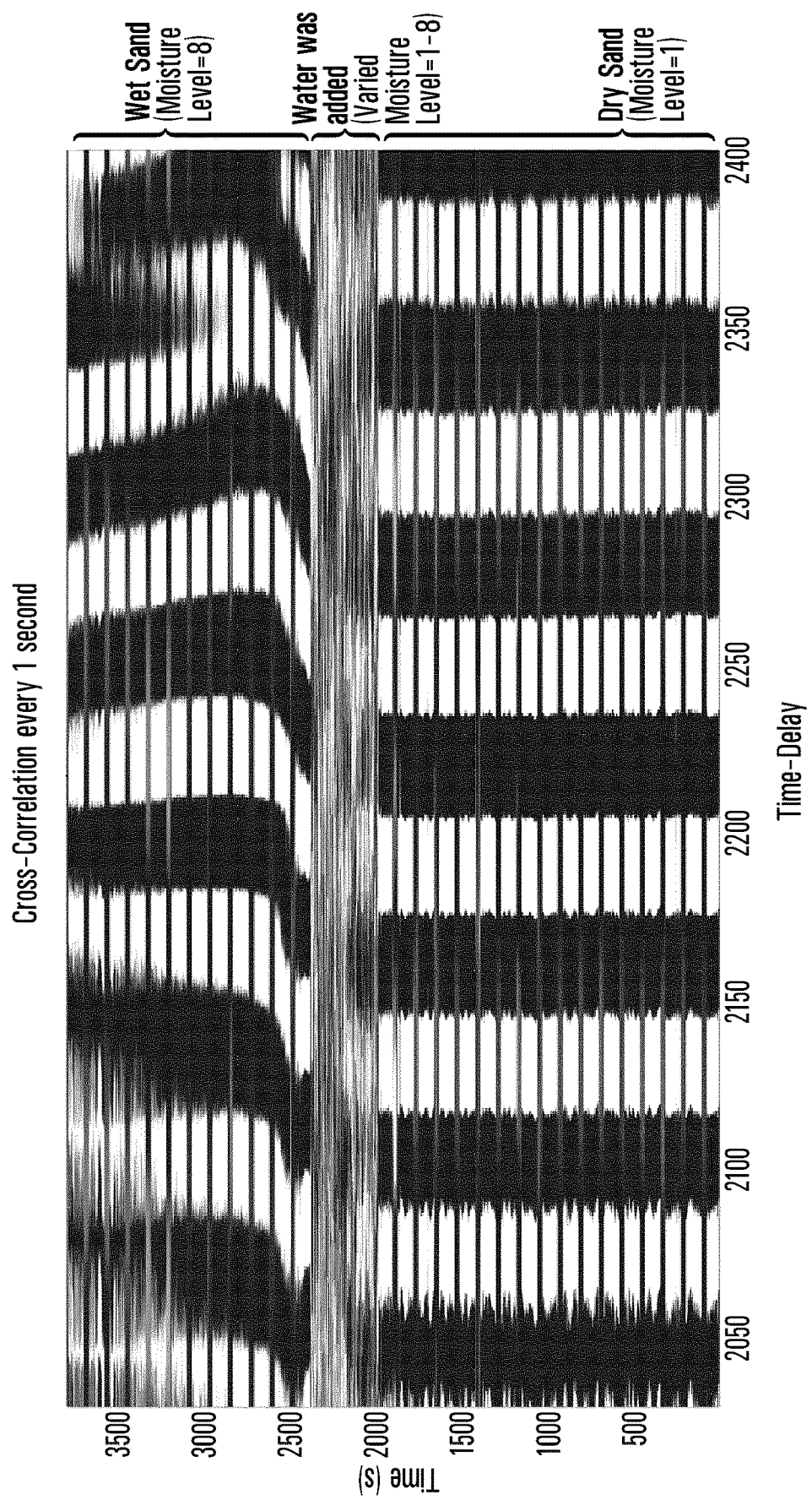
FIG. 6 is a magnified view of a portion of the plot of FIG. 5.

FIG. 6 shows a magnified portion of the plot of FIG. 5. As can be seen, following the addition of water to the sand, the cross-correlation time delay changes, indicative of the change in the speed of sound through the wet sand. The horizontal axis shows the time delay (in units of 25 ms samples)

Figure 7:
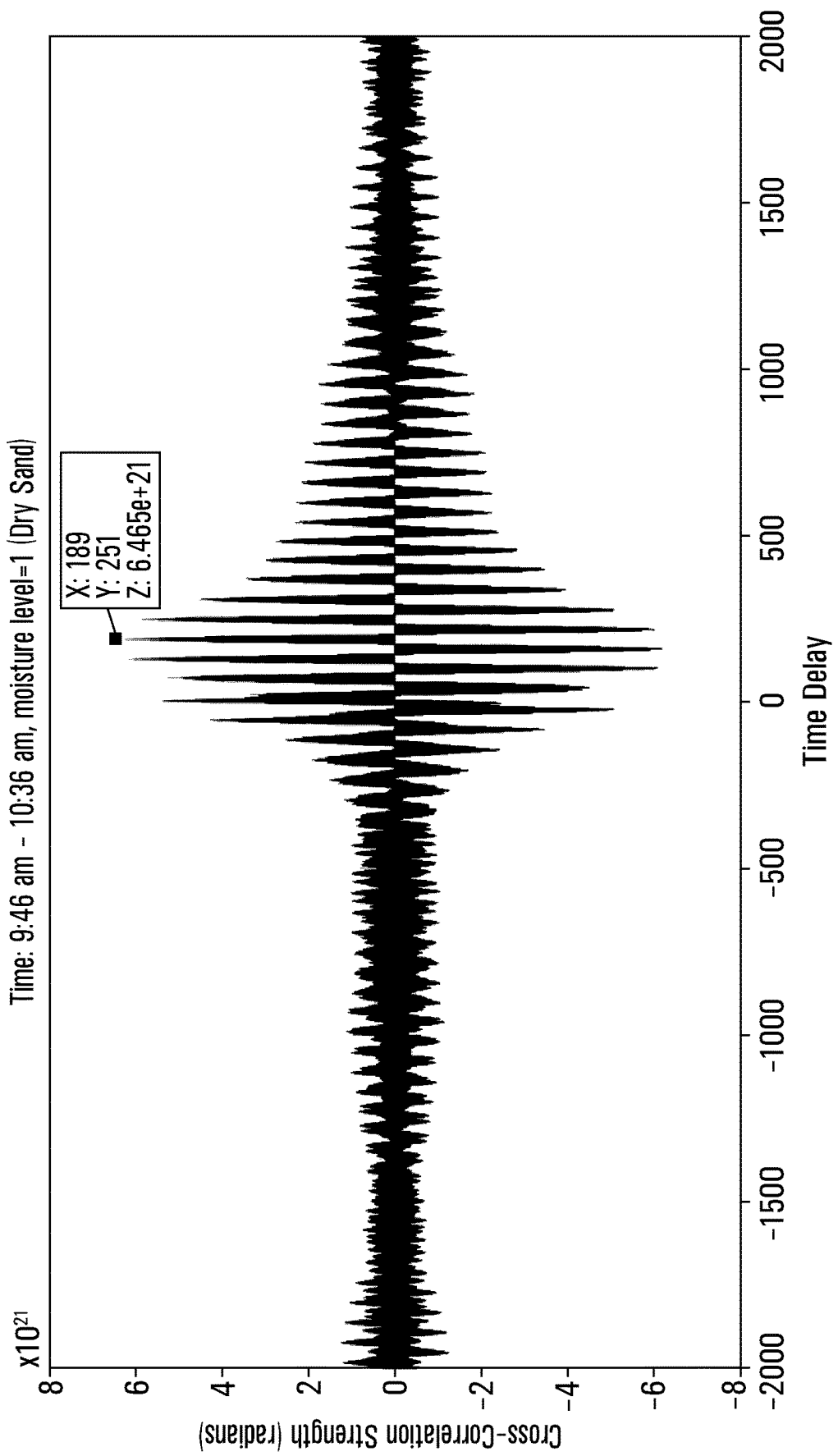
FIG. 7 is a plot of a horizontal slice taken from FIG. 5, showing cross-correlation strength as a function of cross-correlation time delay, in accordance with embodiments of the disclosure.

FIG. 7 is a horizontal slice taken from FIG. 5. In other words, FIG. 7 depicts the cross-correlation strength (y axis) vs. the cross-correlation time delay (x-axis; in units of 25 ms samples) for a particular timeframe.

Figure 8:
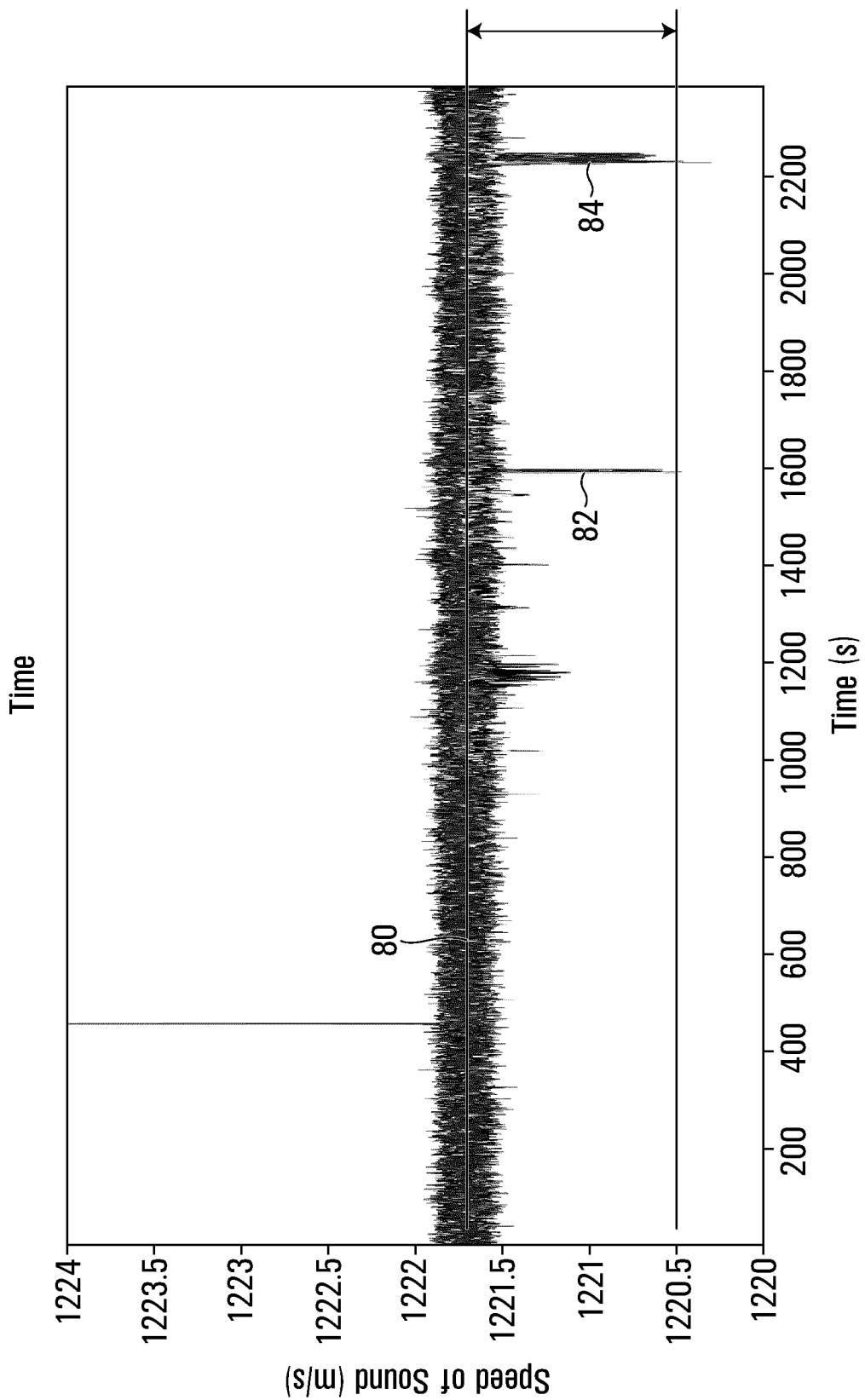
FIG. 8 is a plot of speed of sound as a function of time, in accordance with embodiments of the disclosure.

FIG. 8 is a plot of experimental data illustrating the drop in speed of sound of acoustic events when a leak is detected. The baseline speed of sound is shown at 80. Leaks 82 and 84 correspond to decreases in the measured speed of sound of acoustic events.

According to some embodiments, different portions or channels of the optical fibers may be interrogated. For example, each optical fiber 12, 13 may be divided into a number of channels or portions of optical fiber. In order to distinguish between different channels, as described above, interrogator 14 may employ techniques known in the art such as time division multiplexing (TDM) or wavelength division multiplexing (WDM), or a combination of both. For instance, in the context of WDM, different pulses having different wavelengths may be transmitted along the optical fiber. Each channel of the optical fiber may be provided with FBGs configured to reflect light having a certain wavelength. Depending on the wavelength of the reflections received from optical fiber, interrogator 14 may determine from which channel the reflections originated from. Interrogating different portions or channels of the optical fibers increases the resolution of the leak detection. In particular, a leak may be localized to a specific channel or channels of the optical fiber(s).

Furthermore, instead of using multiple optical fibers to detect acoustic signals, a single optical fiber with multiple channels may be used. Thus, an acoustic signal detected at one channel may be correlated with an acoustic signal detected at another, different channel. Based on the cross-correlation of the acoustic signals, a speed of sound of the acoustic event that resulted in the acoustic signals may be determined and compared to the baseline speed of sound.

Using optical fibers with multiple channels may also enable a user to ignore the effect of a more global increase in soil moisture, for example as a result of rain. In the event of rain, one would expect to observe a decrease in the speed of sound of acoustic events across a substantial length of pipeline. However, in the case of a leak, one would expect to observe a decrease in the speed of sound of acoustic events centred on the location of the leak. Thus, a decrease in the speed of sound of acoustic events across an inordinately long section of pipeline may be attributed to the effect of rain or similar non-leak events, and may be discounted.

According to some embodiments, a confirmation or double-check of the leak detection process may be performed by determining the speed of sound of acoustic events in each of two directions. For example, for two channels x and y (whether of the same optical fiber or of different optical fibers), a speed of sound of an acoustic event travelling from channel x to channel y may be determined. Similarly, a speed of sound of an acoustic event travelling from channel y to channel x may be determined. The determined speeds of sound may be compared to respective baseline speeds of sound for acoustic events travelling in a direction from channel x to channel y, and in a direction from channel y to channel x. In order for a leak to be confirmed, both speeds of sound of the acoustic events determined during the leak detection phase must be sufficiently lower than their respective baseline speeds of sound. Performing this double-check may assist in reducing the likelihood of false positives.

According to still further embodiments of the disclosure, instead of providing optical fiber outside of the fluid conduit, optical fiber or other acoustic sensors may be provided within the fluid conduit. In such cases, a leak may be detected by detecting the speed of sound within the fluid flowing through the fluid conduit. In particular, in the event of a leak, the pressure within the fluid conduit will decrease, thereby affecting the speed of sound within the fluid. The sensors may be used to detect the change in the speed of sound within the fluid, using the methods described above.

In the case of the speed of sound within the fluid itself, the baselining phase should preferably be performed under similar conditions to the leak detection phase. Thus, in order for the determination of a leak to be accurate, the baselining should be performed when a fluid is flowing through the fluid conduit, and, during the leak detection phase, the same fluid should be flowing through the fluid conduit.

Still further, it is possible to implement the leak detection methods described herein using a single detected acoustic signal. In such a case, in order to determine the speed of sound of the acoustic event that resulted in the acoustic signal, the location of an acoustic source that generated the acoustic event must also be known, in addition to the point in time at which the acoustic event was emitted by the acoustic source. This may correspond to the case in which a reflective source is close to the optical fiber. For example, in the case where the optical fiber is buried fairly close (e.g. 0.5 m) from the pipeline, it is likely that acoustic events originating from nearby sources will travel past the optical fiber, and then reflect off the pipeline and towards the optical fiber. By performing an auto-correlation of each channel of the optical fiber with respect to itself, an estimate of the speed of sound in the medium between the pipeline and the optical fiber can be obtained.

While the disclosure has been described in the context of optical fiber, other types of sensors may be used. For example, a microphone or any other suitable acoustic sensor may be used to detect acoustic events.

Furthermore, while the disclosure is focused primarily on the use of acoustic sensors for detecting leaks or similar events in a fluid conduit, the methods and systems described herein may be used more generally for determining or estimating moisture content in soil. For example, one or more acoustic sensors may be used to detect an acoustic event travelling through soil. A speed of sound of the acoustic event may then be compared to a baseline speed of sound, and, based on the comparison, a moisture content of the soil may be determined. Such a method could be used in environmental monitoring, for example (e.g. detecting changes in soil moisture content over time).

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of detecting a leak in a fluid conduit, comprising:
   detecting an acoustic event using at least one sensor positioned to monitor the fluid conduit;
   determining a speed of sound of the acoustic event;
   comparing the speed of sound of the acoustic event to a baseline speed of sound; and
   determining, based on the comparison, whether a leak has occurred in the fluid conduit,
   wherein:
      determining the speed of sound of the acoustic event comprises:
         determining a speed of sound of the acoustic event in a first direction; and
         determining a speed of sound of the acoustic event in a second direction; and
      comparing the speed of sound of the acoustic event to the baseline speed of sound comprises:
         comparing the speed of sound of the acoustic event in the first direction to a baseline speed of sound in the first direction; and
         comparing the speed of sound of the acoustic event in the second direction to a baseline speed of sound in the second direction.

2. The method of claim 1, wherein detecting the acoustic event comprises detecting the acoustic event at one or more different locations, thereby detecting a respective acoustic signal at each of the one or more locations, and wherein determining the speed of sound of the acoustic event is based on the detected one or more acoustic signals.

3. The method of claim 2, wherein determining the speed of sound of the acoustic event comprises:
   determining that first and second acoustic signals detected respectively at first and second different locations correspond to the acoustic event; and
   determining the speed of sound of the acoustic event based on a distance separating the first and second locations and based on an amount of time that has elapsed between detection of the first and second acoustic signals.

4. The method of claim 3, wherein determining that the first and second acoustic signals correspond to the acoustic event comprises determining a cross-correlation of the first acoustic signal with the second acoustic signal.

5. The method of claim 4, wherein the second acoustic signal comprises a reflection of the first acoustic signal, and wherein determining the cross-correlation comprises determining an auto-correlation of the first acoustic signal.

6. The method of claim 1, further comprising, prior to detecting the acoustic event:
   detecting one or more baseline acoustic events using the at least one sensor;
   determining a speed of sound of the one or more baseline acoustic events; and
   determining the baseline speed of sound based on the speed of sound of the one or more baseline acoustic events.

7. The method of claim 6, wherein detecting the one or more baseline acoustic events comprises detecting each baseline acoustic event at one or more different locations, thereby detecting a respective baseline acoustic signal at each of the one or more locations, and wherein determining the speed of sound of the one or more baseline acoustic events is based on the detected one or more baseline acoustic signals.

8. The method of claim 6, wherein detecting the one or more baseline acoustic events comprises detecting the one or more baseline acoustic events when a fluid is flowing through the fluid conduit.

9. The method of claim 8, wherein detecting the acoustic event comprises detecting the acoustic event when the same fluid is flowing through the fluid conduit.

10. The method of claim 1, wherein determining the speed of sound of the acoustic event is based on a distance between the at least one sensor and a known acoustic source, and further based on an amount of time that has elapsed between generation of the acoustic event by the acoustic source and detection of the acoustic event.

11. The method of claim 1, wherein determining whether a leak has occurred comprises determining whether a difference between the speed of sound of the acoustic event and the baseline speed of sound is greater than a preset threshold.

12. The method of claim 1, wherein the at least one sensor is located outside of the fluid conduit.

13. The method of claim 12, wherein the at least one sensor is at least partially buried beneath ground level.

14. The method of claim 1, wherein the at least one sensor is located within the conduit.

15. The method of claim 1, wherein the at least one sensor comprises at least one optical fiber positioned alongside the fluid conduit.

16. The method of claim 15, wherein detecting the acoustic event comprises:
   interrogating the optical fiber to obtain phase data from the optical fiber; and
   extracting from the phase data an acoustic signal corresponding the acoustic event.

17. A system comprising:
   a fluid conduit;
   one or more sensors positioned to monitor the fluid conduit; and
   one or more processors communicative with memory having stored thereon computer program code configured, when executed by the one or more processors, to cause the one or more processors to perform a method comprising:
      detecting an acoustic event using the one or more sensors;
      determining a speed of sound of the acoustic event;
      comparing the speed of sound of the acoustic event to a baseline speed of sound; and
      determining, based on the comparison, whether a leak has occurred in the fluid conduit,
   wherein:
      determining the speed of sound of the acoustic event comprises:

determining a speed of sound of the acoustic event in a first direction; and determining a speed of sound of the acoustic event in a second direction; and comparing the speed of sound of the acoustic event to the baseline speed of sound comprises:

comparing the speed of sound of the acoustic event in the first direction to a baseline speed of sound in the first direction; and comparing the speed of sound of the acoustic event in the second direction to a baseline speed of sound in the second direction.

18. A non-transitory computer-readable medium having stored thereon computer program code configured, when executed by one or more processors, to cause the one or more processors to perform a method comprising:

receiving acoustic data generated from an acoustic event detected using at least one sensor positioned to monitor a fluid conduit;

determining, based on the acoustic data, a speed of sound of the acoustic event;

comparing the speed of sound of the acoustic event to a baseline speed of sound; and determining, based on the comparison, whether a leak has occurred in the fluid conduit, wherein:

determining the speed of sound of the acoustic event comprises:

determining a speed of sound of the acoustic event in a first direction; and determining a speed of sound of the acoustic event in a second direction; and comparing the speed of sound of the acoustic event to the baseline speed of sound comprises:

comparing the speed of sound of the acoustic event in the first direction to a baseline speed of sound in the first direction; and comparing the speed of sound of the acoustic event in the second direction to a baseline speed of sound in the second direction.

* * * * *